Feb. 20, 1973  C. L. ROBERTS  3,717,063

SAW GUIDE FOR CUTTING WEDGES

Filed June 22, 1971

INVENTOR.
CONRAD L. ROBERTS

BY
ATTORNEYS.

United States Patent Office 3,717,063
Patented Feb. 20, 1973

3,717,063
SAW GUIDE FOR CUTTING WEDGES
Conrad L. Roberts, P.O. Box K571,
Twentynine Palms, Calif. 92277
Filed June 22, 1971, Ser. No. 155,509
Int. Cl. B27b 27/06
U.S. Cl. 83—477.2                            9 Claims

ABSTRACT OF THE DISCLOSURE

An adjustable saw guide for cutting wedges which is in the shape of a flat base, having a handle attached to one side. The base is cut out on a diagonal from one corner to accommodate a hinged adjustable guide member to adjust the angularity on a wedge. A second guide member has a tenon stop engaging a slot in the base and is adjustable longitudinally along the base for the tenon stop to be adjusted for the length of the wedge cut. The face of the stop is curved to prevent creep of the wedge into the saw blade under the pressure of the cut and the effect of the tooth set of the saw.

---

This invention deals with a saw guide that is adjustable for angle and length in the cutting of wedges on a table saw.

Wedges made of wood of various angular inclination, height and length are used during the process of construction carpentry to adjust structure for height and location or to hold pieces in position for final assembly.

An object of this invention is to provide a saw guide that will act between the ripping guide and the saw blade on a table saw to cut wedges for structural use.

A further object is to provide a guide which has adjustable angle provisions to cut wedges of various angular rise in varying lengths.

A further object of the invention is to provide an adjustable stop to accommodate various lengths of wedge. Still another object is to provide an adjustable stop having a curved face that will react the cutting pressure of the saw blade on a wedge without having the wedge creep into the saw due to the set of tooth. A further object is to provide a curved face on an adjustable stop to prevent side cutting pressure from radially shifting an adjustable angular stop. These and other objects and advantages of this invention will be seen from a study of the drawings and the detailed description of the preferred embodiment of the invention.

DESCRIPTION OF THE INVENTION

Figure 1:
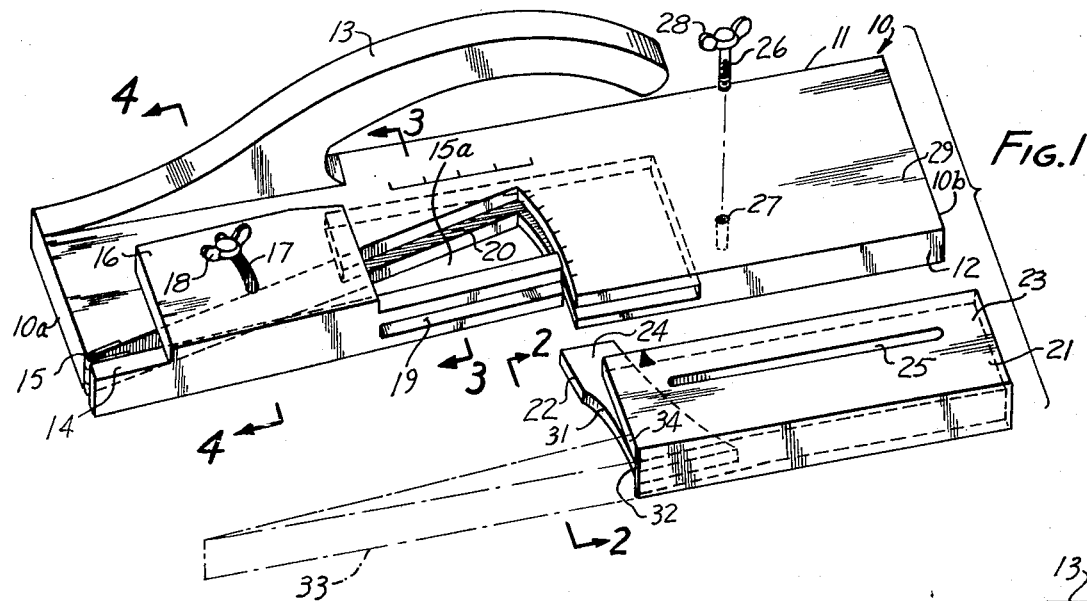
Figure 3:
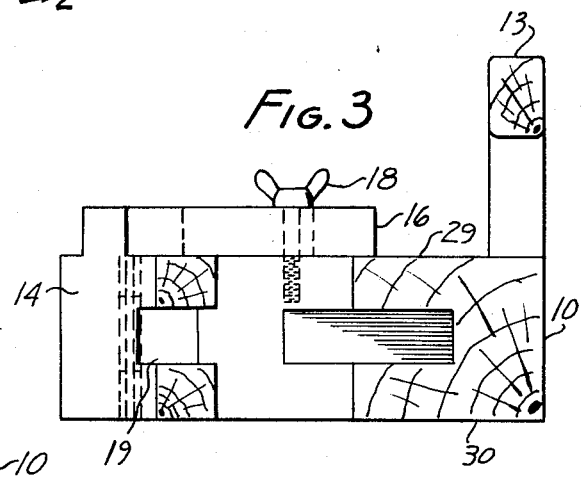
Figure 4:
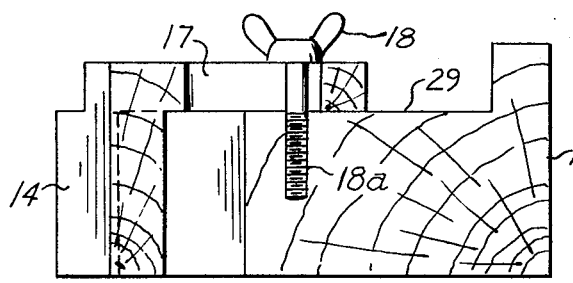
Figure 2:
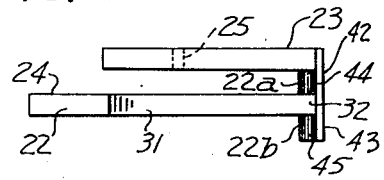
Figure 5:
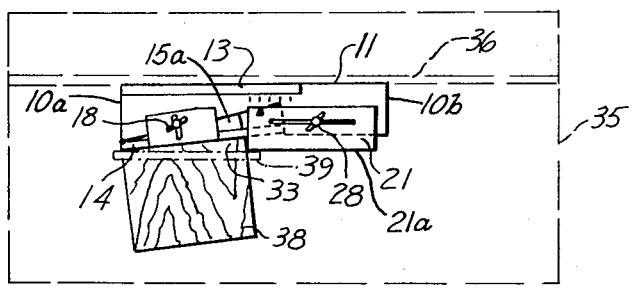

FIG. 1 is a partially exploded view of the preferred embodiment of the invention; shown in oblique form;
FIG. 2 is a cross-section taken on line 2—2 of FIG. 1;
FIG. 3 is a cross-section taken on line 3—3 of FIG. 1;
FIG. 4 is a cross-section taken on line 4—4 of FIG. 1; and
FIG. 5 is a top view of the embodiment of FIG. 1 in position on a table saw.

In FIG. 1 we see a partially exploded view of the preferred embodiment of the invention where the base 10 has a guide surface 11 which is parallel to the length setting gauge surface 12. The base 10 has an upstanding handle 13 which is conveniently located to one side of the base 10 high enough so the hand gripping the guide will clear any obstructions on a saw table that would be used in conjunction with the fixture. The base 10 has an angle setting guide 14 which is swivelly attached by means of hinge 15 so as to rotate in a cut out recess 15a in the base adjacent to the length setting gauge surface. A quadrant member 16 forms an integral part of the angle setting guide and extends laterally over the base 10 and has a through slot 17 which permits a screw 18 to pass through the quadrant member 16 for engagment with a tapped hole 18a in the base 10. The head of the screw has wing tabs to facilitate tightening down the head against the top of the quadrant member, the screw thereby acting as a "first locking means" to hold the angle setting guide at an adjusted position. The angle setting guide has a slot 19 which is of the same height and corresponds with the position of a slot 20 that extends partially through the base 10.

A longitudinal stop member 21 has a tenon 22 which is of a htickness that will slideably engage in the base slot 20 and in the quadrant member slot 19. The longitudinal stop member 21 has a transversely extending top plate 23 which is spaced from the top surface 24 of the tenon member 22 to enable the tenon 22 to slide into the slot 19 of the quadrant member 16 and the base slot 20 of the base 10 while the laterally extending top plate 23 (sometimes called "lateral plate means") can extend over the top planar surface 29 of the base member 10. The laterally extended top plate 23 of the longitudinal stop member 21 has a through slot 25 in it which is of a dimension to allow locking screw 26 to pass through the slot 25 to engage tapped hole 27 in the top surface 29 of the base 10, so that the head 28 of the screw 26 (acting as a "second locking means") may engage the top plate 23 forcing it down onto the surface 29 to contact with the top surface 29 of the base 10 to lock the longitudinal stop member 21 in a desired position. The length of through slot 25 of the longitudinal stop member 21 is determined so that it accomplishes the entire adjustment range for length of the device. The opposite end 10b is sometimes called its "second end." The face 31 (sometimes called a "stop surface") of the tenon 22 acts as the stop for adjusting to the lengths of the wedge to be cut. Surface 31 is curved so that it has a high point of arc at the extreme end 32 on the side (sometime called a "free edge") at the side of the longitudinal slot member where a cutting saw blade would pass, i.e., along the cutting line of the wedge, which is to say adjacent to the plane of the saw blade. This is adjacent to edge 21a of longitudinal stop member 21.

The tenon member 22 is raised above the plane of the bottom planar surface 30 of the base 10 by spacer means 22b and is separated from the top plate 23 by spacer 22a.

The normal saw blade of either rotary or any other type has a rake or "set" on the teeth. This "set" tends to pull unclamped work into the blade on a slope that is equal to the "set" of the tooth, distance from the side surface of the saw blade to the extreme point of the tooth, and the length of the pitch between saw teeth. In other words, the slope of the angle of drag into the saw blade would be the distance of "set" of the tooth divided by the pitch of the teeth of the blade to give the tangent of the angle of drag into the saw blade. However, by resting the base of the wedge 33 being cut against the concave curved surface 31 of the tenon 22, the force of the cut against the saw blade 39 holds the base 34 of the wedge 33 in contact with the curved surface 31, and any tendency to drift into the saw blade 39 is negated by the fact that the wedge would have to resist the force of the cut and travel upward along the curve 31 to the high point 32 against the force of the cut, which is normally much greater than the tendency of the set of the saw tooth to drag the workpiece wedge 33 into the saw. This feature allows repeatability of angle for a quantity of wedges being cut. In order to assure that only contact with the curved surface 31 is maintained, the spacer portions 22a and 22b of the longitudinal stop member 21 have relieved surfaces 44 and 45 which come to an apex adjacent to the high point 32 of the curved surface 31.

FIG. 5 shows the invention in use on a table-saw 35. The guide surface 11 of the base 10 rests on the table and slides along the ripping fence 36 of the table-saw 35. The longitudinal stop member 21 is adjusted for the length of the wedge 33 being cut. The angle guide member 14 is adjusted for the angle of the wedge. The wood block 38 supplies the material from which the wedge is cut. After the guides are adjusted the operator holds the handle 13 with his right hand and the wood block 38 which is resting at an angle along angle guide 14 with his right hand shoving the handle 13 along the ripping fence 36 with the guide edge 11 in contact with the ripping fence 36. The left hand guides the wood block 38 and it is pushed along into the saw blade 39 thus parting off the finished wedge 33. The length of the wedge 33 is determined by the length of the wood block 38 which is cut from stock lumber and the longitudinal stop 21 is used to adjust the device for the length of wood block 38 that is being utilized.

This invention is not to be limited by the description or the preferred embodiment, but only in accordance with the scope of the appended claims.

I claim:

1. A saw guide for cutting wedges on a table saw having a ripping fence parallel to a circular saw blade which comprises: a base, said base having a first and a second end, said base having a guide surface and a gauge surface, said guide and gauge surfaces parallel to each other, said base having a top planar surface and a bottom planar surface; an angle-setting guide rotatably hinged to said first end of said base, said base having a cut-out recess, said angle-setting guide being rotatable within said cut-out recess for adjustment of angle; locking means adapted to hold said angle-setting guide in an adjusted position with respect to said base; a longitudinal stop member; a tenon on said longitudinal stop member, said base and said angle-setting guide having aligned slots, said tenon being adapted to slideably engage in said slots, said longitudinal stop member being adapted to slide along said gauge surface of said base for adjustment, second locking means for holding said longitudinal stop member in an adjusted position with respect to said base, said tenon having a stop surface, said stop surface being adapted to retain a wedge workpiece against sideward motion during cutting action, said tenon member adapted to adjustably protrude into said cut-out recess.

2. A device as described in claim 1 in which said stop surface is in the form of a curved surface said curved surface terminating in a free edge, said free edge being located along the cutting line of said wedge, said curved surface and said free edge being adapted to restrain said wedge workpiece from lateral motion under cutting forces.

3. A device as described in claim 1 which includes handle means, said handle means being upstanding from said top planar surface of said base.

4. Apparatus as described in claim 1 which includes a quadrant member as a part of said angle-setting guide, said quadrant member extending laterally from said angular adjustment means, said quadrant member extending over said top planar surface of said base, said quadrant member being releasably engaged by said first locking means for locking said angular adjustment member in an adjusted relationship with said base.

5. Apparatus as described in claim 4 which includes a slot in said quadrant member, and in which said first locking means comprises a headed screw threadedly engaged to said base and passing through the slot to engage said quadrant member for locking engagement.

6. Apparatus as described in claim 1 which includes lateral plate means on said longitudinal stop member, said lateral plate means extending over said top planar surface of said base, said lateral plate means being adapted to be engaged by said second locking means for locking said longitudinal stop member in an adjusted position with respect to said base.

7. Apparatus as described in claim 6 which includes a slot in said lateral plate means and in which said second locking means comprises a headed screw threadedly engaged to the base and passing through said last-named slot to engage said lateral plate means and lock it to said base.

8. Apparatus as described in claim 7 in which the longitudinal stop member includes a first spacer means below said tenon and a second spacer means between said tenon and said lateral plate means, said spacer means each having an angular relief, each said angular relief being adapted to clear said stop surface of said tenon for said tenon to contact with said wedge workpiece.

9. Apparatus as described in claim 1 in which said cut-out recess is in the form of a sector of a circle with the origin of the sides of said sector at said first end of said base.

References Cited

UNITED STATES PATENTS

| | | | |
|---|---|---|---|
| 2,679,868 | 6/1954 | Johnson | 143—51 A |
| 2,968,325 | 1/1961 | Wandvik | 143—169 |
| 3,465,797 | 9/1969 | Kimber | 143—169 |
| 3,519,038 | 7/1970 | Booth | 143—168 |

DONALD R. SCHRAN, Primary Examiner

U.S. Cl. X.R.

83—527

UNITED STATES PATENT OFFICE
CERTIFICATE OF CORRECTION

Patent No. 3,717,063      Dated February 20, 1973

Inventor(s) Conrad L. Roberts

It is certified that error appears in the above-identified patent and that said Letters Patent are hereby corrected as shown below:

Column 2, line 12, "htickness" should read -- thickness --.

Column 2, line 32, after "device" insert -- End 10a of the guide is sometimes called its "first end". --.

Column 2, line 36, cancel "on the side".

Column 2, line 37, "(sometime" should read -- (sometimes --.

Signed and Sealed this fifteenth Day of June 1976

[SEAL]

Attest:

RUTH C. MASON
Attesting Officer

C. MARSHALL DANN
Commissioner of Patents and Trademarks